Nov. 24, 1970 G. BAUM 3,543,229
METHOD AND APPARATUS FOR THE DISPLAY AND RECORDATION OF SIGNALS
Filed Oct. 3, 1968 4 Sheets-Sheet 1

INVENTOR.
GILBERT BAUM

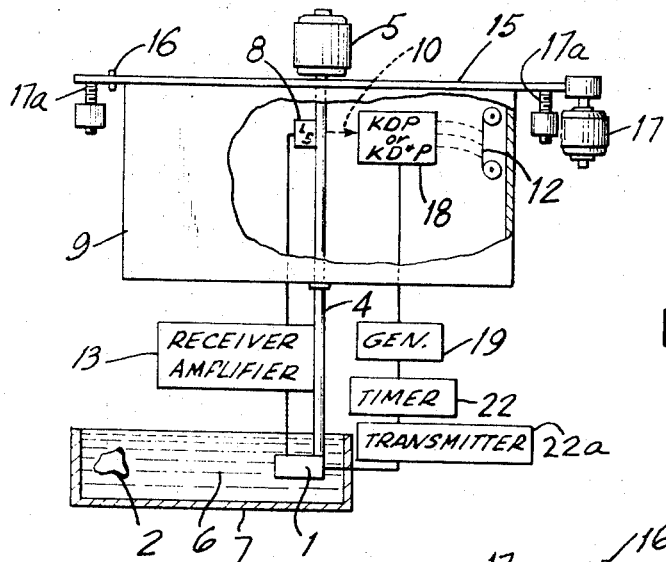
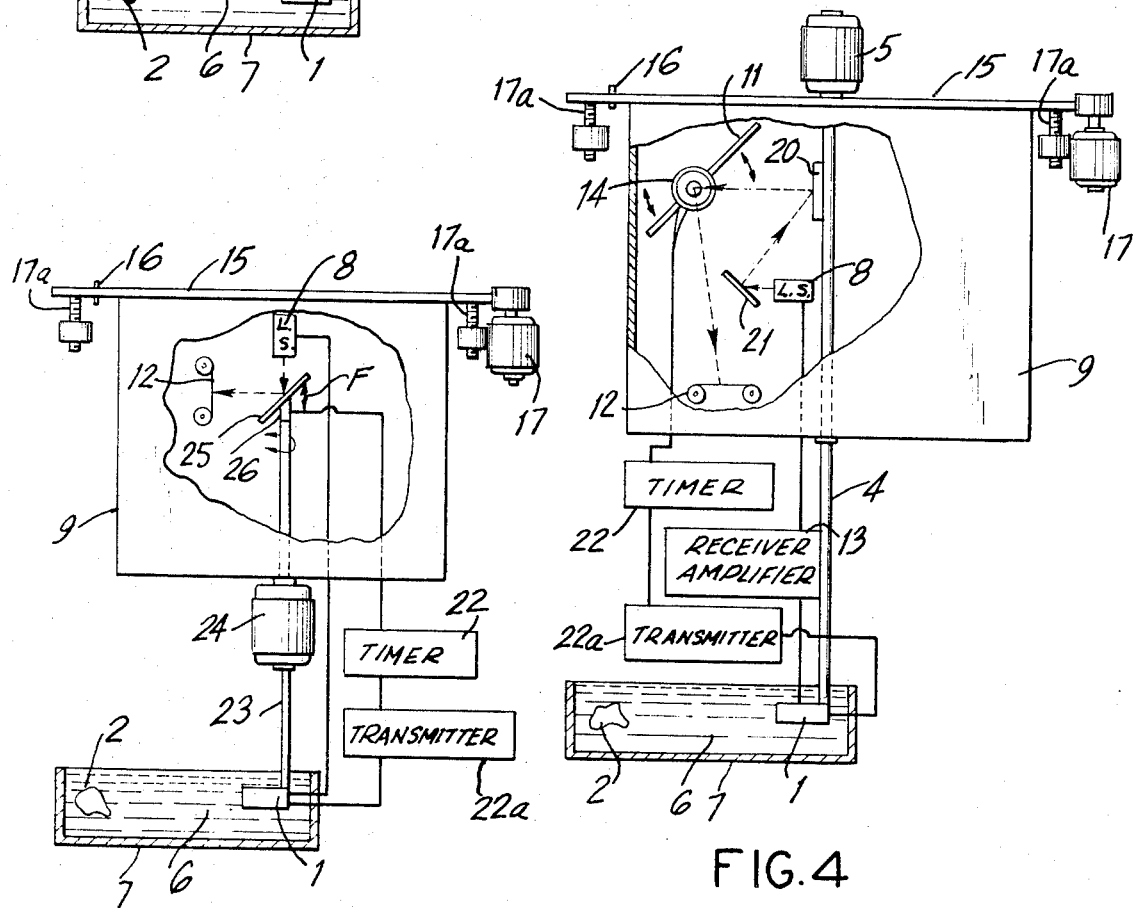

United States Patent Office 3,543,229
Patented Nov. 24, 1970

3,543,229
METHOD AND APPARATUS FOR THE DISPLAY AND RECORDATION OF SIGNALS
Gilbert Baum, 152 Brite Ave., Scarsdale, N.Y. 10583
Filed Oct. 3, 1968, Ser. No. 764,795
Int. Cl. G01s 9/66
U.S. Cl. 340—3
33 Claims

ABSTRACT OF THE DISCLOSURE

The present invention provides apparatus and methods for signal display and recordation by employing the signal carrying the information to be displayed as a modulating signal for a light-emitting source. The system of the present invention provides for the disposition of the light emitted responsive to the signal applied thereto to be spatially correlated on a display surface to the area of emanation of such signal. The present invention contemplates the initiating signal to be an ultrasonic signal.

---

The present invention relates to methods and apparatus for the display and recordation of signals, and more particularly to methods and apparatus for the display and recordation of ultrasonic signals.

The use of ultrasonography as a diagnostic tool has, in recent years, become more intensified. It has been found that an object capable of returning echoes can be measured through the amplitude of the returning echo signals of an ultrasonic pulse sent to such object. In terms of diagnosis of the human body ultrasonography has the capabilities of providing information that is only otherwise obtainable by surgical visualization of the tissues.

However, the full potential uses of ultrasonography have not as yet been obtained, due to the rather complex instrumentation employed in the display of the data obtained.

Simply stated, the general techniques presently employed include the use of a scanning device, which scans the area of interest and emits an ultrasonic pulse at various intervals. The returning echoes from each pulse are presented on a cathode ray tube. This technique requires the use of position signal generators, such as resolvers, potentiometers, special amplifiers, deflection yokes and a cathode ray tube display and equipment for cathode ray tube photography.

Not only is the equipment and circuitry requisite in a cathode ray display relatively expensive, the circuitry itself is relatively complex, thus compounding the probabilities of malfunction and relatively expensive replacement and/or repair.

An additional problem in presentation has been that of a scan producing data of an incomplete nature. Unless the energy reflected from the various interfaces of the object studied returns to the echo recipient, there are no signals displayed to represent such interface. With the varying contours generally found within the human body, the probabilities of such incomplete data being received is accentuated. To overcome this problem, various compound scanning techniques have been developed to sample a particular interface from various angles, thus assuring receipt of the echoes of interest, and further defining the echoes of interest.

According to the present invention, methods and apparatus are provided for presentation and recordation of the data carried by the returning echoes. The present invention eliminates the need for cathode ray tube display and all associated position generating equipment and further, provides the mechanism for compound scanning techniques so that a complete "picture," such as would be comparable to the compound scan P.P.I. (plan position indicator) picture displayed on the cathode ray tube is obtainable.

The data obtained through use of the apparatus of the present invention, may be directed immediately to a photosensitive surface for permanent recordation with the data display being in the nature of an "intensity modulated" display. Light and dark areas will be presented on the face of the photosensitive surface, the light and dark areas being directly correlated to the intensity of the returning echo from the object of study.

The present invention generally provides a transmitter, generally a transducer of a piezo-electric nature, for the emission of the ultrasonic pulse to the object for study; an echo recipient, which preferably is the same piezo-electric transducer, which picks up the various returning echoes from the pulse; a light source which is adapted to emit a modulatable beam, whose intensity is modulatable based upon the input of electrical stimulus thereto; and, means to present the light as emitted on the photosensitive surface across the face of such photosensitive surface in a like manner and directly correlated to the manner by which the ultrasonic pulse is passing through the object for study and returning echoes.

While as hereinafter described, the present invention has significant value in the use of the study human tissue such as the eye, it will become readily apparent that the invention has uses in a plurality of other fields for the recordation of ultrasonic signals.

Although such novel feature or features believed to be characteristic of the invention are pointed out in the claims, the invention and the manner in which it may be carried out may be further understood by reference to the description following in the accompanying drawings.

FIG. 3 is a diagrammatic view of an alternate embodiment of the present invention.

FIG. 4 is a diagrammatic view of a further embodiment of the present invention.

FIGS. 5–7 are alternative views of diagrammatic form of further embodiments of the present invention.

Referring now to the figures in greater detail where like reference numbers denote like parts in the various figures.

Figure 1:
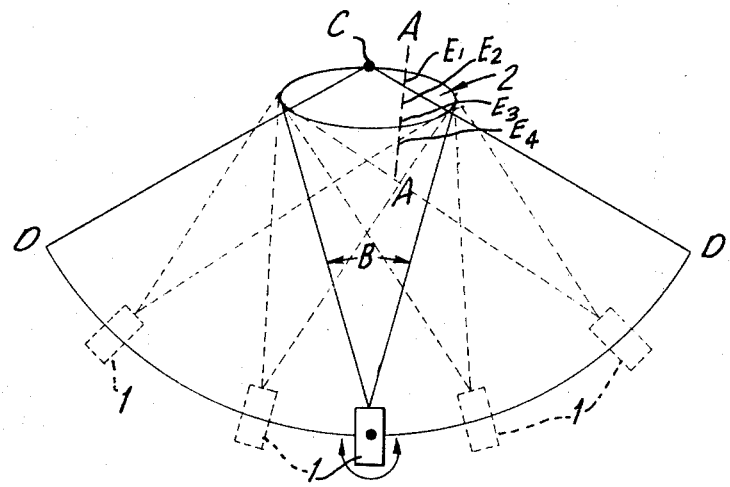
FIG. 1 is a top schematic view of a compound scan according to the present invention.

FIG. 1 is a top view which illustrates the component parts of the compound scan. The transducer 1 is preferably a piezoelectric element which is adapted to emit an ultrasonic pulse when actuated and receive the returning echoes. The object for study, generally denoted by the numeral 2 sends a plurality of echoes back to the transducer 1 in response to a single ultrasonic pulse. These echoes are indicative of the various interfaces in the object 2 and the amplitude of the returning echoes differs with respect to the structural makeup of the various interfaces. Thus, an ultrasonic pulse emitted from the transducer 1 would pass through, for example, the object 2 along the path indicated as A—A in FIG. 1, with a plurality of echoes returning in response to such pulse originating from various depths along line A—A. The transducer 1 is pivotally mounted so that when actuated, it will sweep across the object 2, as indicated by sector B. The transducer emits ultrasonic signals and receives echoes therefrom along the various points of the object 2 within the sector B. This is what is commonly referred to as a sector scan or as a simple scan.

In order to study the object along various vantage points, the transducer travels along arc D—D, with the center of rotation of the arc D—D being a point C on the object 2. The arc is on a plane parallel to the sector scan.

It may of course be appreciated that the mechanical motion of the transducer as it pivots and travels along D—D is relatively slow and that a great multitude of emissions and echo receptions take place within a simple sector scan B. The various sector scans B shown in phantom along arc D—D are merely illustrative, it being readily apparent that a greater or lesser number of sector scans may be provided for the transducer as it passes along arc D—D.

Upon completion of a single compound scan, the transducer may then be vertically disposed along a lower or higher plane and the compound scan repeated. While the foregoing has dealt with simple and compound sector scans, it is readily apparent that a simple and compound linear scan may be accomplished in a like manner.

If desired, the echoes received by the transducer 1 could be displayed on a cathode ray display and then photographically recorded. The use of a cathode ray tube would then require associated position signal generators such as resolvers and potentiometers, operational and deflection amplifiers and high resolution cathode ray tube displays and photography. This equipment is very expensive and is extremely delicate and complex. Furthermore cathode ray tubes possess limited dynamic range and introduce noise into the system.

Figure 2:
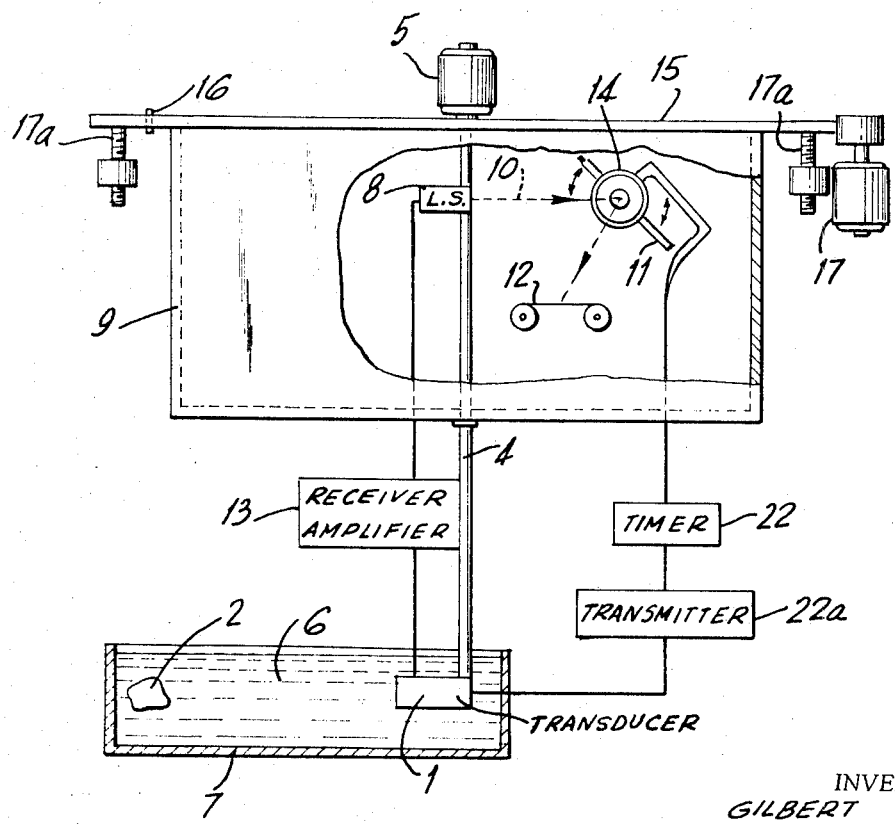
FIG. 2 is a diagrammatic view of an apparatus of the present invention.

The present invention eliminates the need for resolvers or potentiometers, cathode ray tubes, amplifiers and deflection amplifiers and simplifies the photographic process. Thus, as illustrated in FIG. 2, the transducer 1 is mounted on a shaft 4 and pivotally rotated for its simple scan motion by a motor 5. As shown in FIG. 2, the transducer 1 and the object 2 are preferably within a coupling medium 6 such as water, glycerine, or oil, so that the energy generated by the transducer may be transferred to the object 2 with little dissipation and loss. The coupling medium 6 is contained in the examining tank 7.

The shaft 4 for the transducer is preferably at right angles to the transducer and passes through a lighttight enclosure 9. A light source 8 is preferably mounted at the center of rotation of the shaft 4 and aligned with the transducer 1, so as to provide a 1-to-1 aligned pivotal motion as between the light source 8 and the transducer 1. The light output of the light source 8 will vary in proportion to the amplitude of the returning echoes of the object 2. While various light sources are adaptable for such purpose, so long as they are able to react with a speed sufficient to modulate a light beam which varies in intensity in direct proportion to the intensity of the returning echo, and modulate such beam at a high rate of speed, light sources having an ability to emit an intense collimated beam have been found highly suitable. Thus, lasers are suitable and p-n (positive-negative) junction gallium arsenide injection diode employed for a pulse operation, is also employable with suitable optics. Additionally, the narrow beam so emitted aids the presentation of the data in that there is a minimum of light dispersion. It should be noted that lasers may be of more immediate usage in that recordation on the photosensitive surface 12 as hereinafter described requires a photosensitive film or crystal with the ability to record at great speeds a rapidly projected light.

Since the light source 8, as shown in FIG. 2 is mounted on the shaft 4 of the transducer 1, the light source 8 is therefore positionally displaced at a 1-to-1 relationship with the transducer 1.

Since a single ultrasonic pulse emitted from the transducer 1 along a single given position during scanning will result in a plurality of echoes, means must be provided for the positional displacement of the varying intensity light beam so that its position correlates with the position of the interface emitting the echo. Thus, referring to the path of a single pulse A—A of FIG. 1, echoes which return from interfaces indicated as $E_1$, $E_2$, $E_3$, $E_4$ are to be positioned along the photosensitive surface 12 as they are emitted from the radial coordinate A—A.

As shown in FIG. 2, a reflective surface 11, adapted to either rotate and/or oscillate along its longitudinal axis, provides the "writing" mechanism for the light beams 10. The light source will emit a beam whose amplitude varies in proportion to the amplitude of the received echos of the transducer. These amplitude varying signals are emitted by the transducer through an amplifier 13 and act to fire the modulated light source 8. Thus, if the mirror is oscillated or rotated at a speed correlated to the speed of the returning echoes from the object 2 the light beam 10 will strike the reflective surface 11 at a degree of rotation of the reflective surface 11 so that the displacement of the light beam on the photosensitive surface 12 will be proportional to the speed of the echos from the object. Thus, the beam emitted light strikes the reflective surface 11 at various intervals along the oscillating or rotating path of the reflective surface 11. The light beams will then be "written" as a line across the face of the photosensitive surface 12 with the line made up of various gradations of dark and light areas depending upon the intensity of the beam as it was emitted from the light source 8.

The reflective surface 11 is driven, as shown in FIG. 2 by a synchronous motor 14 which is pretimed relative to the transmitted pulse and the speed of the ultrasonic pulse through the coupling medium and the tissue.

Thus, for example, the speed of sound through body tissue is approximately 1,500 meters per second. If, therefore, the reflective surface 11 were rotated at a speed sufficient to provide a linear traversal of the light beam at the photosensitive surface 12 of 1,500 meters per second, it would constantly write the received echo signals at physical spacings accurately corresponding to the actual physical spacings of the sound reflecting interfaces in the object 2. However, since the transducer 1 pulses intermittently, that is a transmitting pulse to send an ultrasonic signal and then an "off" cycle to receive echoes, the speed of oscillation or rotation of the reflective surface is preferably halved. The rotation of the mirror is synchronous with the transmitted pulse and if desired the rotation of the mirror can be used to "trigger" the pulse to the transducer.

To provide the compound scanning arc D—D of FIG. 1, the light tight enclosure 9 is mounted on a moveable plate 15 which has its center of rotation 16 at point on the object 2. The plate 15 is driven by conventional means to pivot, such as by a motor 17. Thus the entire lighttight enclosure will pivot about an arc indicated as D—D in FIG. 1 and at the same time the shaft 4 is pivoting the transducer 1 to provide the sector scan indicated in FIG. 1 as B.

The entire assembly including the compound scanning plate 15 and its associated drive motor is mounted on a vertical stepper 17a by which scans at different vertical levels may be made. The action of the vertical stepper 17a may be automated and sequential or may be manually controlled.

In lieu of the reflective surface 11 such as shown in FIG. 2, an electrooptic may be employed. Referring then to FIG. 3 an electrooptically induced change of the refractive index of a crystal 18 as the emitted light beams from the light source 8 passes therethrough may effect the "writing" of the light beam across the photosensitive surface 12.

As a result of their linear electrooptic response, low conductivity, high optical transparency and high optical quality, KDP crystals (tetragonal potassium dihydrogen phosphate) and the more sensitive KD*P (potassium dideuterium phosphate) crystals may be highly suitable.

These crystals have what is termed an "optic axis" and upon application of an electric field at right angles to the optic axis the KDP and KD*P crystals experience a change of refractive index as the electric field varies. They thus provide deflectors and modulators offering wide dynamic ranges with the ability to follow rapid variations in applied voltages.

The electric field which will change the "optic axis" of the crystal 18 is initiated by a generator 19 which in turn is triggered by the signal output of the timer 22. Thus the electric field generated through the crystal varies in proportion to the signal generated by the generator 19 and is directly correlated to the reception signals of the transducer 1. A "saw tooth generator" would be readily adaptable for this purpose.

In lieu of a direct affixation of the light source 8 on the transducer shaft 4 a reflective surface 20 may be mounted on the center of rotation of the shaft 4, such as illustrated in FIG. 4 with the light source 8 so positioned as to emit its beam and have such emitted beam directed, such as by a mirror 21 to the reflective surface 20 to the "writing" reflective surface 11 and then to the photosensitive surface 12.

It is appreciated that the rotational or oscillating movement of the reflective surface 11 must be timed to correlate with the transducer 1 and a timing and transmitting mechanism indicated generally in all figures as 22, 22a may be provided for such purpose.

It should also be noted that various compound scans along different levels of the object 2 are readily obtainable by having the plate 15 actuatable vertically, through the stepping mechanism 17a associated therewith, as hereinbefore described. Thus, at the completion of a compound scan the plate can be stepped up or down thus raising or lowering the lighttight enclosure 9, shaft 4 and transducer 1.

An alternate arrangement is illustrated in FIG. 5 wherein the light source 8 is fixedly mounted within the lighttight enclosure 9, the light source 8 lying in a plane along the central axis of the transducer shaft 23. The transducer shaft 23 only traverses partway into the lighttight enclosure 9 and the motor 24 which actuates the transducer 1 for its sector scan motion is positioned along the shaft. At the upper end of the shaft 23 is mounted the reflective surface 25. The reflective surface 25 is adapted to be oscillated through use of an oscillating means 26. The speed of oscillation is controlled in the manner similar to that heretofore discussed with respect to FIG. 2, that is through a timer and transmitter, the speed of oscillation being directly correlated to the speed of sound through the object 2 for study. The reflective surface 25 while reciprocating in the directions indicated by the arrow F is also being rotated on the shaft 23 so that it follows the sector scan of the transducer 1. For simplicity and clarity, the receiver-amplifier 13 is not shown in this figure, but it is understood to be present.

Figure 6:
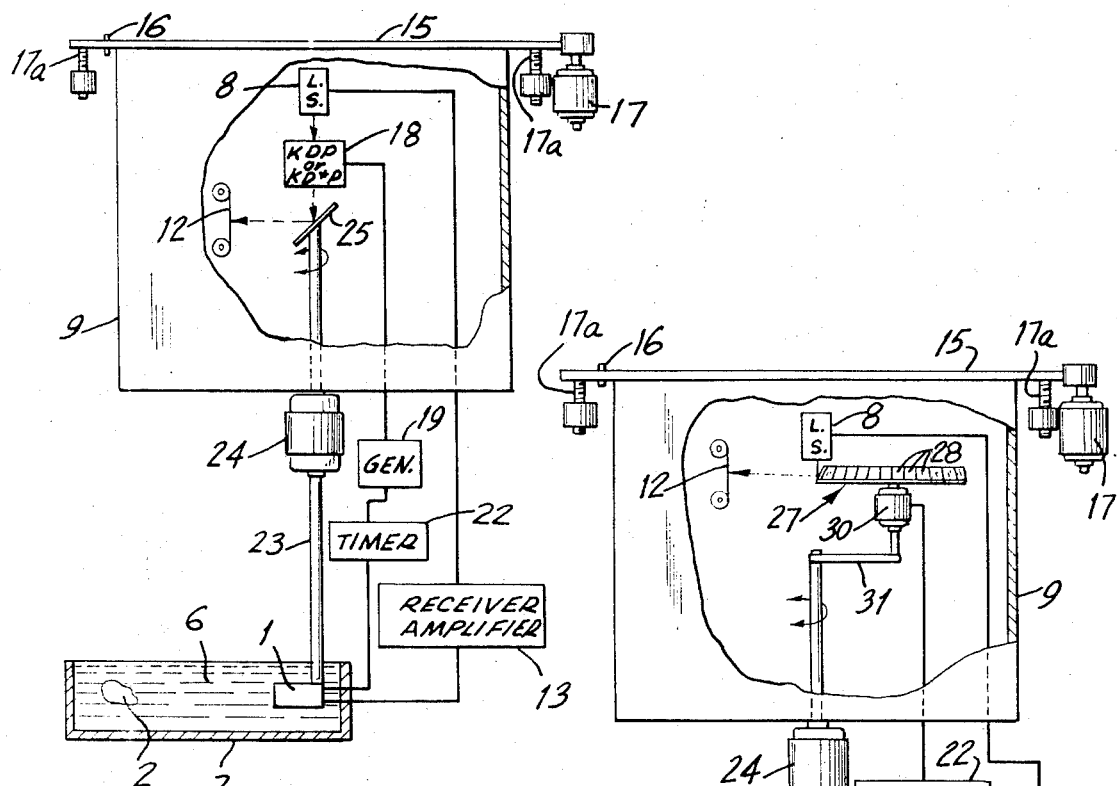

As illustrated in FIG. 6 the need for an oscillating reflector surface can be eliminated and the electrooptic crystals 18, such as the KDP and KD*P crystals hereinbefore described may be substituted. The refraction of the light beams as they pass through the crystal 18 is controlled in a like manner to that hereinbefore described with respect to FIG. 3.

Figure 7:
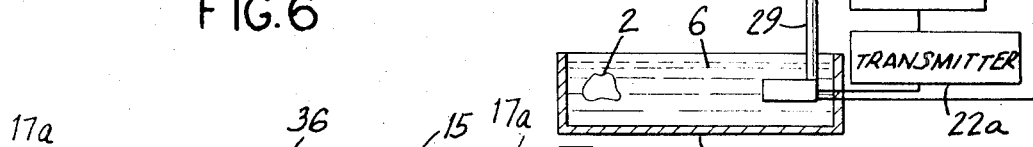
Figure 7A:
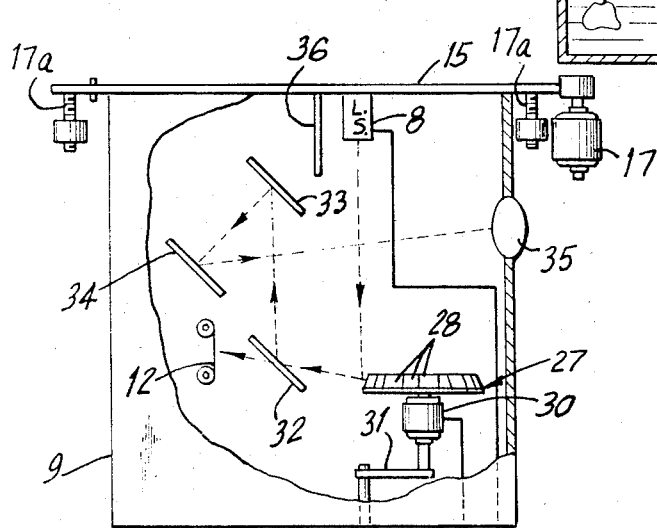
FIG. 7A is a front elevation of the reflective surface of FIG. 7.

In order to avoid possible timing difficulties with the oscillating and rotating reflective surfaces hereinbefore described due to possible inertially effected time lapses during change of direction or otherwise, the reflective surface may be in the nature of a plurality of reflective surfaces having predetermined attitudes circumferentially disposed about a flywheel. Thus as shown in FIGS. 7 and 7A the light source 8 is mounted on a plane spaced apart from but along the central axis of the transducer shaft 29 with the transducer shaft 29 having mounted thereon a rotatable wheel 27 having reflective surfaces 28 of varying attitudes disposed about its circumference. The reflective surfaces 28 intersect the light beam emitted from the light source 8 at a point along the central axis of the shaft 29. The speed of rotation of the wheel 27 as it is driven by its associated motor 30 is timed to the timing and transmitting mechanism 22, 22a as hereinbefore described. Since the wheel 27 is directly affixed to the shaft 29 by arm 31 the wheel 27 will pivot to follow the sector scan of the transducer 1. The speed of the flywheel may be used as a control, as a timer, or as a trigger for the transmitted pulse.

As with other embodiments the lighttight enclosure is mounted on the plate 15 so as to effect the compound scan upon actuation of the motor 17, if such compound scan is desired.

Figure 8:
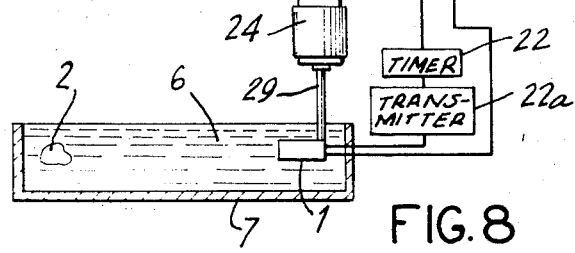
FIG. 8 is a diagrammatic view of the present invention providing both recordation and simultaneous viewing.
Figure 9:
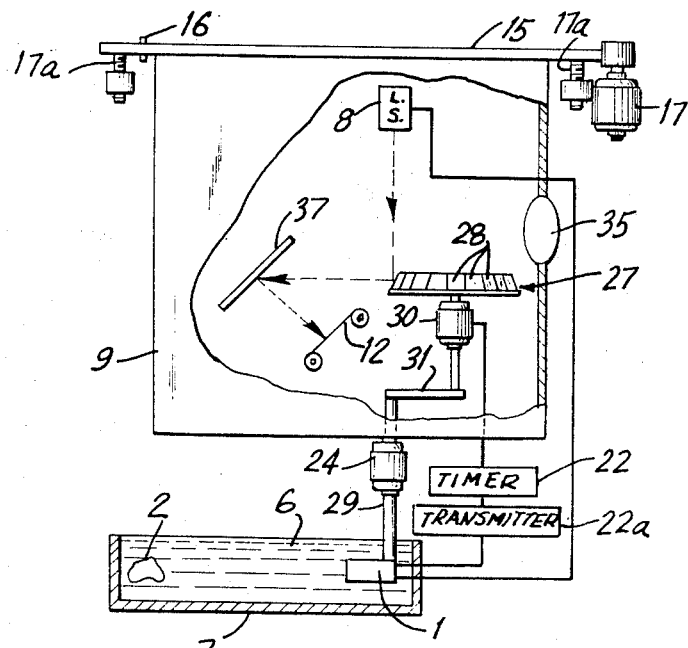
FIG. 9 is a diagrammatic view of an alternate simultaneous viewing and recording embodiment.

If it is desired to have simultaneous viewing as well as photography an arrangement such as illustrated in FIGS. 8 and 9 may be employed. As shown in FIG. 8 a periscope-arrangement is presented whereby the "written beam" as it is directed towards the photosensitive surface 12, for example by an arrangement similar to that hereinbefore described with respect to FIG. 7, is split by a beam splitter 32. The split portion of the beam not directed to the photosensitive surface 12 is directed to a mirror or screen 33. Either a photochromic mirror or screen or a phosphorescent screen may be employed. A photochromic screen would absorb the light and emit an image having a hue other than that of the frequency of the beam which struck it. The emitted light would then be directed towards a dichroic mirror 34 which would mask all undesired colors and the beam could then be viewed through an optical filter 35 emplaced on one of the sides of the lighttight enclosure 9. It may be desirable to employ a light shield 36 between the light source 8 and the photochromic screen 33 so that the screen would only react to the split beam directed towards it.

In lieu of the photochromic screen a phosphorescent screen may be employed so as to provide a greater resolution to the split beam and greater lifetime to the light projected to the screen.

In view of the "writing" speed of the light beam it may be desirable in any event to provide a phosphorescent screen to be "read" by the photosensitive surface 12 such as shown in FIG. 9. This can readily be accomplished by removing the beam splitter of FIG. 8 so that the light is transmitted directly to the phosphorescent screen 37. The image on the screen 37 is then simultaneously viewed and photographed. Viewing may be through the optical filter 35 on the lighttight enclosure 9 with the phosphorescent screen enhancing the lifetime of the beam so that it is more easily read and recorded on the photosensitive surface 12.

Figure 10:
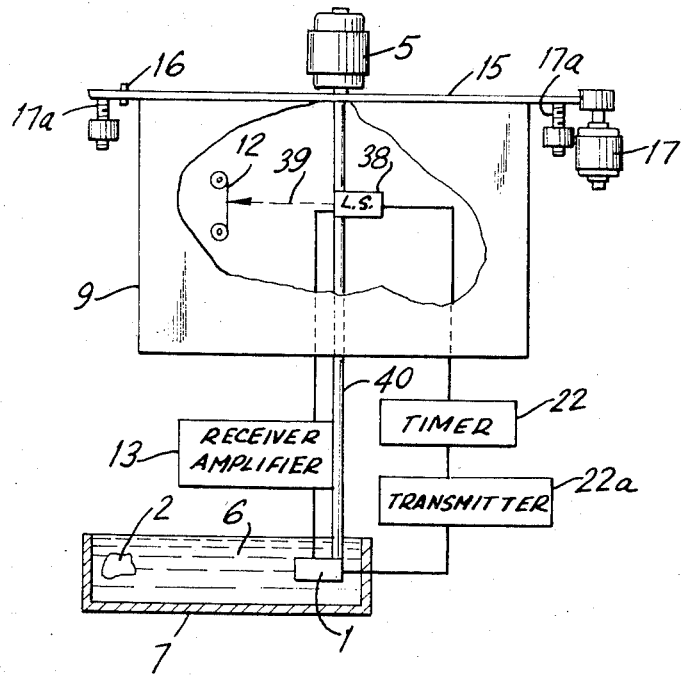
FIG. 10 is a diagrammatic view of an additional embodiment of the present invention.

While all of the light sources hereinbefore described whether of the light diode or laser variety are adaptable to be modulated so far as the intensity of the beam emitted based upon the imput transmitted to it by the transducer 1, it is within the scope of the present invention to employ lasers such as are presently in development in the art which may be internally deflected and modulated so that the light beams emitted from the laser 39 will sweep across the photosensitive surface 12. Thus, as is illustrated in FIG. 10 a laser 38 mounted at the center of rotation of the transducer shaft 40 would follow the arc of the sector scan of the transducer 1; the positional movement of the lighttight enclosure 9 to follow the compound scan; and would "write" across the face of the photosensitive surface and thus eliminate the need for the reflective surfaces or electrooptic crystals hereinbefore described.

The internal deflection within the laser 38 would be controlled through the timer 22 and transmitter 22a in a like manner as hereinbefore described with respect to the reflective surfaces 11, 25, and 28.

It is readily apparent that various other drive means for the various reflective surfaces may be provided.

While various reflecting, refracting and modulating means have been illustrated, it is within the scope of the present invention to provide for magneto-optic modulation and deflection; electrooptic modulation as well as deflection; and various other acousto-optic deflection and modulation means. Thus, for example, various crystals when subjected to a magnetic field or electric current will modulate a light beam and various known variable reflectors, variable refractors, birefringent deflectors and interference deflectors may be substituted as the deflecting, refracting or modulating means in lieu of those illustrated herein.

Additionally, various types of photosensitive surfaces such as light sensitive crystals may be employed for recordation purposes.

While the foregoing has dealt primarily with ultrasonics it is appreciated that this entire system with the substitution of a microwave transmitter for the piezoelectric crystal and microwave receiver for the receiving element can be used to generate a radar P.P.I. display.

The terms and expressions which are employed are used as terms of description; it being recognized though that various modifications are possible though, within the scope of the invention claimed.

Having thus described certain forms of the invention in some detail what is claimed is:

1. An apparatus for the display of an ultrasonic signal comprising, ultrasonic pulse emission means adapted to emit an ultrasonic pulse to an object, said ultrasonic pulse emission means being movably mounted to scan a planar path along said object, an echo recipient adapted to follow the path of said ultrasonic pulse emission means and operable to receive from the object echoes of the ultrasonic pulses emitted by the ultrasonic pulse emission means, a light directing member spaced apart from said ultrasonic pulse emission means adapted to travel along a plane parallel to said planar path, a substantially lighttight enclosure, said light directing member being positioned within said lighttight enclosure, and means to present said echoes in an intensity modulated display positionally displaced in ratio to the point of emanation of each said echo from said object including, a light source connected to said echo recipient and operable in response to varying echo intensity signals received from said echo recipient and adapted to emit a collimated beam having an intensity variable in proportion to the intensity of said echo intensity signals, said light source being positioned within said lighttight enclosure, each said beam being guided by said light directing member; light beam display means; and light beam displacement means interposed between said light directing member and said light beam display means and adapted to alter the path of each of said light beams to present said light beams across the face of said display means to give a two-dimensional display of said received echoes.

2. The apparatus as claimed in claim 1 wherein said display means includes a photosensitive surface.

3. The apparatus as claimed in claim 1 wherein said display means includes a phosphorescent screen.

4. The apparatus as claimed in claim 1 wherein said display means includes a photochronic mirror and dichromic screen.

5. The apparatus as claimed in claim 1 wherein said light beam displacement means includes a reflective surface moveable about a fixed axis and adapted to present varying attitudes of reflection to said light beams, said reflective surface timed to travel at a speed in ratio to the speed of said signals through said object.

6. The apparatus as claimed in claim 1 wherein said reflective surface includes a rotating mirror.

7. The apparatus as claimed in claim 1 wherein said reflective surface includes an oscillating mirror.

8. The apparatus as claimed in claim 1 wherein said reflective surface includes a plurality of mirrors having differing attitudes disposed about a rotating wheel.

9. The apparatus as claimed in claim 1 wherein said moveable reflective surface is in operative contact with and adapted to trigger means to transmit signals to said object.

10. The apparatus as claimed in claim 1 wherein said light beam displacement means includes an electrooptic adapted to refract the light beams passing therethrough and said apparatus further includes means to transmit an electric signal at a right angle to the optic axis of said electrooptic.

11. The apparatus as claimed in claim 10 wherein said electrooptic is a potassium dihydrogen phosphate crystal.

12. The apparatus as claimed in claim 10 wherein said electrooptic is a potassium dideuterium phosphate crystal.

13. The apparatus as claimed in claim 10 wherein said means to transmit said electric signal to said electrooptic includes a generator.

14. The apparatus as claimed in claim 1 wherein said ultrasonic pulse emission means, said echo recipient and said light directing member are connected to a common shaft.

15. The apparatus as claimed in claim 1 wherein said ultrasonic pulse emission means and said echo recipient are piezoelectric elements.

16. The apparatus as claimed in claim 1 wherein said ultrasonic pulse emission means and said echo recipient include a single piezoelectric element.

17. The apparatus as claimed in claim 1 wherein said light source is said light directing member.

18. The apparatus as claimed in claim 17 wherein said light source is a laser.

19. The apparatus as claimed in claim 17 wherein said light source is a light diode.

20. The apparatus as claimed in claim 16 including, means adapted to rotate said shaft.

21. The apparatus as claimed in claim 16 wherein said lighttight enclosure is movably mounted and adapted to rotate about an axis aligned at 180° to a point on said object.

22. The apparatus as claimed in claim 16 including means to alter the vertical position of said lighttight enclosure.

23. A method of displaying ultrasonic signal scan pulse generated data comprising the steps of transmitting an ultrasonic pulse to an object, receiving signals from said object responsive to said transmitted pulse, said recipient signals being the returning pulse echoes therefrom, converting each of said recipient pulse signals to an electric pulse signal having an intensity which is proportional to the recipient pulse signal, transmitting said electric pulse signal to a light source to cause said light source to emit a pulsed collimated light beam having an intensity variable in proportion to the intensity of said electric pulse signal and directing each said emitted beam pulse along a display zone, each said beam pulse being further spatially correlated along another axis relative to the area of emanation of the signal to which said beam is responsive to give a two-dimensional display of said received echo.

24. The method as claimed in claim 23 wherein the step of directing each emitted beam to a spacial correlation relative to the area of emanation of said signal includes the refracting of each said emitted beam by passage of each said light beam through an electrooptic prior to the projection of each said beam on said display zone.

25. The method as claimed in claim 23 wherein the step of directing each emitted beam to a spacial correlation relative to the area of emanation of said signal includes the reflecting of each said beam from a reflective surface, said reflective surface travelling about a fixed axis to present a varying attitude of reflection for each said beam, said reflective surface timed to travel at a speed in direct ratio to the speed of said transmitted signal through said object.

26. The method as claimed in claim 25 wherein the trigger of the transmitting of said signals to said object is actuated by said reflective surface.

27. The method as claimed in claim 23 wherein said display zone is a photosensitive surface.

28. The method as claimed in claim 23 wherein said display zone is a phosphorescent screen.

29. The method as claimed in claim 23 including the penultimate step of directing said light beam to a photochromic mirror and wherein said display zone is a dichroic screen.

30. The method as claimed in claim 23 further including the step of repeating said ultrasonic pulsing and echo reception along a transverse plane through said object.

31. The method as claimed in claim 23 further including the step of transmitting said ultrasonic pulses from varying points equidistant from a point on said object.

32. The method as claimed in claim 23 further including the step of repeating said ultrasonic pulsing and echo reception along at least a second transverse plane.

33. The method as claimed in claim 23 further including the step of repeating said ultrasonic pulsing and echo reception along at least a second transverse plane through said object.

References Cited

UNITED STATES PATENTS

| | | | |
|---|---|---|---|
| 2,769,160 | 10/1956 | Fryklund | 340—3 |
| 2,836,059 | 5/1958 | Beaujard et al. | 73—67.8 |
| 2,992,876 | 7/1961 | Ellis | 346—110 |
| 3,027,219 | 3/1962 | Bradley | 346—110 |
| 3,034,127 | 5/1962 | Walling et al. | 346—109 |
| 3,247,709 | 4/1966 | Gordon | 73—67.8 |
| 3,284,799 | 11/1966 | Ross | 343—6 |
| 3,314,073 | 4/1967 | Becker | 346—108 X |
| 3,400,363 | 9/1968 | Silverman | 340—3 |
| 3,438,057 | 4/1969 | Neitzel | 346—107 |

OTHER REFERENCES

Preston et al.: Applied Physics Letters, vol. 10, No. 5, Mar. 1, 1967, pp. 150–152.

RICHARD A. FARLEY, Primary Examiner

U.S. Cl. X.R.

73—67.8; 346—108